(12) United States Patent
Kitaoka et al.

(10) Patent No.: US 6,937,982 B2
(45) Date of Patent: Aug. 30, 2005

(54) SPEECH RECOGNITION APPARATUS AND METHOD USING TWO OPPOSITE WORDS

(75) Inventors: Norihide Kitaoka, Nishikamo-gun (JP); Hiroshi Ohno, Kariya (JP)

(73) Assignee: Denso Corporation, Kariya (JP)

(*) Notice: Subject to any disclaimer, the term of this patent is extended or adjusted under 35 U.S.C. 154(b) by 639 days.

(21) Appl. No.: 09/907,594

(22) Filed: Jul. 19, 2001

(65) Prior Publication Data

US 2002/0010579 A1 Jan. 24, 2002

(30) Foreign Application Priority Data

Jul. 21, 2000 (JP) ........................................ 2000-220564

(51) Int. Cl.⁷ .............................................. G10L 15/08
(52) U.S. Cl. ....................... 704/252; 704/239; 704/243; 704/244
(58) Field of Search ................................ 704/231, 239, 704/243, 244, 251, 252, 255, 236, 237

(56) References Cited

U.S. PATENT DOCUMENTS

| | | | |
|---|---|---|---|
| 5,566,272 A | | 10/1996 | Brems et al. |
| 6,167,398 A | * | 12/2000 | Wyard et al. .................. 707/5 |
| 6,192,337 B1 | * | 2/2001 | Ittycheriah et al. ......... 704/231 |

FOREIGN PATENT DOCUMENTS

| | | |
|---|---|---|
| JP | A-H1-116700 | 5/1989 |
| JP | A-H3-248199 | 11/1991 |
| JP | A-H08-211892 | 8/1996 |
| JP | A-9-244691 | 9/1997 |
| JP | A-H11-337365 | 12/1999 |
| JP | A-2000-69348 | 3/2000 |
| JP | A-2001-222291 | 8/2001 |
| JP | A-2002-21121 | 1/2002 |

\* cited by examiner

Primary Examiner—Susan McFadden
(74) Attorney, Agent, or Firm—Posz Law Group, PLC

(57) ABSTRACT

A speech recognition apparatus recognizes a speech signal received from a speaker and provides the result of recognition for an external device. In the apparatus, a pattern matching section performs pattern matching between each of reference patterns in a vocabulary and characteristic parameters extracted from the speech signal. The vocabulary includes reference patterns corresponding to words. Further the apparatus has a similar sound group which includes reference patterns corresponding to the sound similar to that of a specific word. The specific word is a word in response to which the external device performs an operation which cannot be easily undone. The speech signal is rerecognized by using the similar sound group. As a result, the pattern matching section outputs a word other than the specific word, if one of the reference patterns in the similar sound group has a high similarity with the characteristic parameters.

24 Claims, 4 Drawing Sheets

|  | RECOGNITION RATE OF "YES" (SUCCESS/SAMPLE) | RECOGNITION RATE OF "NO" (SUCCESS/SAMPLE) | MISRECOGNITION RATE OF OTHER WORDS AS "YES" ("YES" OUTPUT/SAMPLE) |
|---|---|---|---|
| PRIOR ART | 100(18/18) | 95.3(486/510) | 61.9(915/1477) |
| EMBODIMENT | 100(18/18) | 98.2(501/510) | 8.7(128/1477) |

SPEECH RECOGNITION APPARATUS AND METHOD USING TWO OPPOSITE WORDS

CROSS REFERENCE TO RELATED APPLICATION

This application is based on and incorporates herein by reference Japanese Patent Application No. 2000-220564 filed on Jul. 21, 2000.

BACKGROUND OF THE INVENTION

1. Field of the Invention

The present invention relates to a speech recognition apparatus and method.

2. Related Art

A conventional speech recognition apparatus and method used as a man-machine interface analyzes a speech signal received via a microphone and extracts characteristic parameters from the speech signal. The characteristic parameters are compared with reference patterns in a vocabulary stored in a dictionary section of the apparatus, and one or more words corresponding to the reference patterns which have high similarities with the extracted characteristic parameters are selected and outputted. The apparatus generally selects and outputs at least a word even if no reference pattern in the vocabulary has a high similarity with the characteristic parameters. In this case, the speech signal is often misrecognized. Further the speech signal is often misrecognized due to the background noise. If the result of the misrecognition is used for controlling an external device, the operation of the external device may be adversely and seriously affected.

For example, the speech recognition apparatus is used for a car navigation device which has a voice-control function for receiving a speech as an input control signal and outputting a speech as a query to a user or a reply to the user's query. If the user says 'shukushou' which means 'reduce' so that the map is reduced, it may be misrecognized as 'jitaku' which means the user's house. In this case, the apparatus discards the route to the destination and newly searches a route to the user's house, if the apparatus is configured to execute a command immediately in response to the input speech signal. In this way, the route to the destination is discarded against the user's will.

If the apparatus is configured to confirm the user's will, it queries 'Your house will be set as the destination. OK?', for example. If the user says 'iie' which means 'NO' as a reply to the query, the apparatus shifts to a wait state without searching a route to the user's house. However, the apparatus may misrecognize a user's reply as 'hai' which means 'YES', if the user says 'shukushou' again as a reply to the query by mistake. In this case, the route to the destination is also discarded.

In this way, the external device may operate against the user's will, if the speech signal from the user is misrecognized as a specific word such as 'hai' included in the vocabulary. Therefore, it is preferable that the speech recognition apparatus employs a technique for preventing the external device from performing an erroneous operation, which cannot be easily undone, against the user's will in response to the result of misrecognition.

SUMMARY OF THE INVENTION

The present invention has an object to provide a speech recognition apparatus which rarely misrecognizes an input speech signal as a specific word in the vocabulary. It is also an object to provide a record medium which stores a program and data for implementing a main function of the speech recognition apparatus in a computer system.

In a speech recognition apparatus according to the present invention, a pattern matching section performs pattern matching between each of reference patterns in a vocabulary and the extracted characteristic parameters of a speech signal. The vocabulary is stored beforehand and includes the reference patterns corresponding to words which should be identified. Further, a specific word in response to which the external device performs an operation which cannot be easily undone is selected from the vocabulary, and the similar sound group of the specific word is stored beforehand. The similar sound group includes the reference patterns corresponding to sounds which are similar to but different from that of a specific word. The pattern matching section selects as candidate words one or more words corresponding to the reference patterns which have high similarities with the characteristic parameters as the result of the pattern matching. If the candidate words include the specific word, the speech signal is rerecognized by using the similar sound group. That is, the pattern matching section performs pattern matching between each of the reference patterns in the similar sound group and the characteristic parameters of the speech signal. As a result of the rerecognition, the pattern matching section outputs a word other than the specific word if one of the reference patterns corresponding to the sounds similar to that of the specific word has a high similarity with the speech signal.

Preferably a program for implementing the function of the pattern matching section in a computer system and data including the reference patterns corresponding to the words and the sounds are provided as a record medium which stores the program and the data.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT (First Embodiment)

Figure 1:
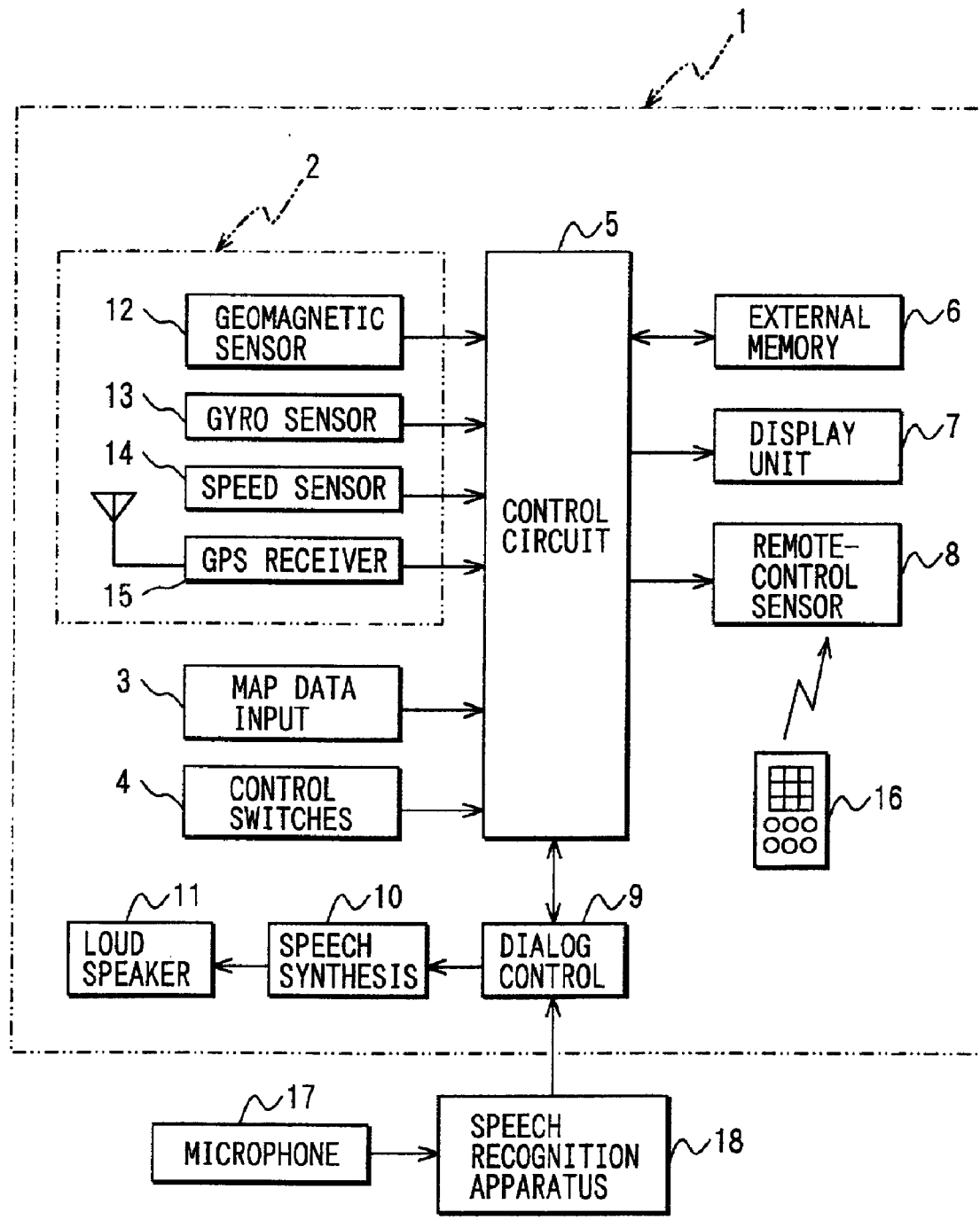
FIG. 1 is a block diagram of a car navigation equipment to which a speech recognition apparatus according to a first embodiment of the present invention is connected.

Referring to FIG. 1, a car navigation equipment is connected to a speech recognition apparatus 18 used as a man-machine interface for the car navigation equipment 1.

The car navigation equipment 1 includes a position detecting unit 2, a map data input unit 3, control switches 4, a control circuit 5, an external memory 6, a display unit 7, a remote-control signal sensor 8, a dialog control section 9, speech synthesis section 10, and a loudspeaker 11. The control circuit 5 mainly comprises a microcomputer, and connected to the position detecting unit 2, the map data input unit 3, and the control switches 4. The external memory 6, the display unit 7, the remote-control signal sensor 8, and the dialog control section 9 are connected to the control circuit 5.

The position detecting unit 2 includes a geomagnetic sensor 12, a gyro sensor 13, a speed sensor 14 and a GPS receiver 15. The GPS receiver 15 detects the position of a vehicle based on the radio wave received from the GPS satellite. Each of the sensors 12–15 is placed in an appropriate position within the vehicle. The control circuit 5 receives signals from the sensors 12–15 and interpolates them, because each of the sensors 12–15 has an error of a different type. The control circuit 5 detects the present position, traveling direction, speed, mileage of the vehicle accurately based on the received signals.

The map data input unit 3 is formed with a drive unit for retrieving data from a storage medium which stores various data such as road map data, map matching data for correcting the detected present position. A mass storage medium such as CD-ROM, DVD-ROM may be employed as the storage medium. The road map data includes the shapes, widths, names of roads, and various buildings or facilities on the roads and their phone numbers. Further it includes the names and geographical features of places, and data used for displaying the road map on the display unit 7.

The control switches 4 include mechanical switches which are used by a user (driver) for inputting various commands. The user can designate the destination or select the road map displayed on the display unit 7 by using control switches 4. Some of the control switches 4 may include touch switches on the screen of the display unit 7. Further a remote-control terminal (remote controller) 16 which has the same function as the control switches 4 is provided. A control signal from the remote controller 16 is detected by the remote-control signal sensor 8.

On the screen of the display unit 7, the road map is displayed with various scales. Further pointers which indicate the present position or traveling direction of the vehicle are superimposed on the displayed road map. A recommended route to the destination may be also superimposed on the displayed road map. Further a form for prompting the user to input the destination and the like or various massages and information are also displayed on the screen.

The road map is retrieved by the map data input unit 3. The control circuit 5 directs the display unit 7 to display the retrieved road map on the screen, and further to superimpose the pointers which indicate the present position and the traveling direction of the vehicle based on the output from the position detecting unit 2. For indicating the present position of the vehicle accurately on the road map, the control circuit 5 performs map matching. Further the control circuit 5 directs the display unit 7 to change (the scale of) the map displayed on the screen.

The control circuit 5 performs an automatic route search and route guidance. In the automatic route search, the control circuit 5 automatically calculates a recommended route from the present position of the vehicle to a destination inputted by the user. In the route guidance, the control circuit 5 directs the display unit 7 to display the recommended route on the screen as described above. Further the control circuit 5 may direct the speech synthesis section 10 to generate an audio guide such as 'turn left at the intersection 200 meters ahead' via the dialog control section 9 during the route guidance. The generated audio guide is outputted via the loudspeaker 11.

The speech recognition apparatus 18 is connected to the dialog control section 9 so that the user's safety and the user-friendliness of the car navigation equipment 1 are improved. The user (driver) can input a command (destination search command, reroute command or map scale change command) or the destination (user's house or registered point) by voice while keeping his/her eyes on the road ahead. The speech recognition apparatus 18 receives a speech signal, which represents a command or the destination, from the user via a microphone 17, and recognizes it. The result of the recognition is provided for the dialog control section 9. The microphone 17 is placed in an appropriate position within the vehicle so that it receives the user's voice well. For example, the microphone 17 is attached to the top surface of the steering column cover or to the sun visor over the driver's seat.

Figure 2:
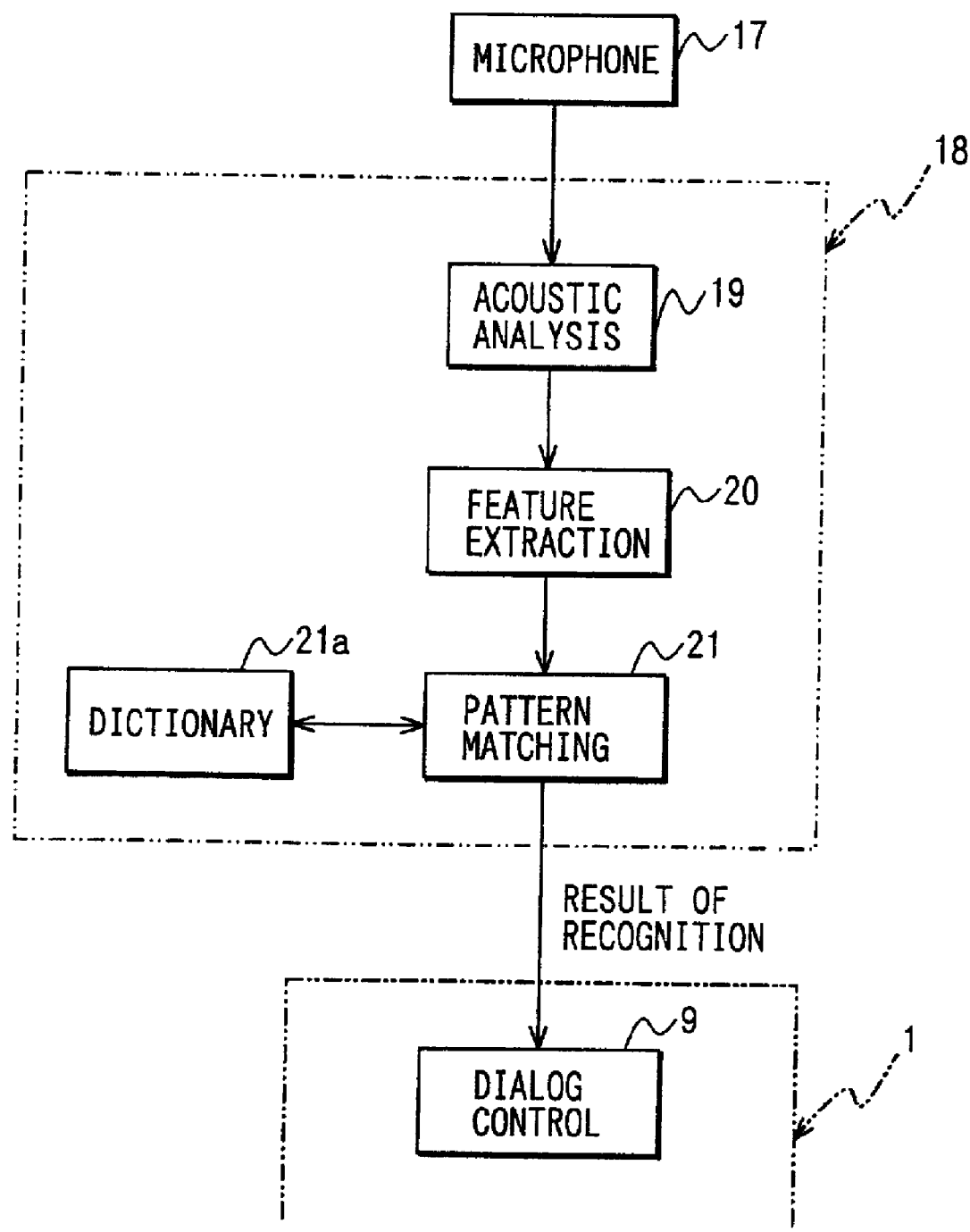
FIG. 2 is a block diagram of the speech recognition apparatus according to the first embodiment of the present invention.

Referring to FIG. 2, the speech recognition apparatus 18 includes an acoustic analysis section 19, a feature extraction section 20, and a pattern matching section 21.

The acoustic analysis section 19 receives the analog speech signal from the microphone 17, and samples it at a sampling frequency of 12 kHz into digital signals. The digital signals are divided into frames so that the frames have a fixed length and overlap each other. For each of the frames, the Fourier transform of the frame is computed, so that the acoustic spectrum of the speech signal is provided. Further the square of the amplitude of the acoustic spectrum is computed, so that the short-time acoustic power spectrum is obtained. The inverse Fourier transform of the power spectrum is computed, so that auto-correlation coefficients are provided. The LPC (linear predictive coding) analysis is performed using the auto-correlation coefficients, so that LPC coefficients are obtained. The LPC coefficients are sequentially provided for the feature extraction section 20.

The feature extraction section 20 computes LPC cepstrum coefficients for each of the frames based on the LPC coefficients received from the acoustic analysis section 19. The LPC cepstrum coefficients are sequentially provided for the pattern matching section 21 as characteristic parameters.

The pattern matching section 21 performs pattern matching between each of reference patterns in a vocabulary stored in the dictionary section and time-series data of the LPC cepstrum coefficients. That is, the time-series data is divided into segments by using hidden Markov models and the similarity (i.e., likelihood ratio) between each of the reference patterns and each of the segments is computed. The dictionary section is a part of a fixed memory of the speech recognition apparatus. Each of the reference patterns is a time-series of LPC cepstrum coefficients which are computed beforehand and correspond to one of words which should be identified.

The pattern matching section 21 selects as candidate words one or more words corresponding to the reference patterns which have the high similarities with the LPC cepstrum coefficients. In the case of a conventional speech recognition apparatus, the candidate words are provided for the dialog control section 9 as the result of the recognition.

However, the present speech recognition apparatus 18 rerecognizes the speech signal as follows, if the speech signal has been received in some situations and the candidate words include a specific word. The specific word is a critical word for the car navigation equipment 1. That is, the car navigation equipment 1 performs an operation that cannot be easily undone if it receives the specific word. The speech recognition apparatus 18 generates and stores the similar sound group of the specific word beforehand. The similar sound group includes reference patterns corresponding to sounds which are different from but similar to that of the specific word. The rerecognition of the speech signal is performed by using the similar sound group of the specific word.

The apparatus 18 further generates reference patterns corresponding to sounds similar to that of a second specific word beforehand, if necessary. The second specific word is a word which means the opposite to the specific word. The generated reference patterns are added to the similar sound group.

The rerecognition of the speech signal will be explained by means of example. When the car navigation equipment 1 receives a voice-command such as 'reroute', 'my house', 'go home' or 'change the destination', it outputs a voice message such as 'Your home will be set as the destination. OK?' for confirming the user's will. In this way, the user is prompted to input 'YES' or 'NO' by voice as a reply to the voice-message. In this case, the speech recognition apparatus 18 selects the word 'YES' as the above specific word and the similar sound group of the word 'YES' is generated. This similar sound group includes reference patterns corresponding to sounds /j//*//s/, /j//e//*/ and the like. The symbol '*' stands for an arbitrary vowel or a consonant. Further, the word 'NO' is selected as the second specific word and reference patterns corresponding to sounds similar to that of the word 'NO' is also generated and added to the similar sound group. The reference patterns corresponding to sounds /au/, /uu/, and the like are added to the similar sound group in this case. It is preferable that the similar sound group should include the reference patterns corresponding to sounds similar to that of the second specific word, when the speech signal is received in an either-or situation like this case.

The pattern matching section 21 performs pattern matching between each of the reference patterns in the similar sound group and the LPC cepstrum coefficients of the speech signal, when the candidate words include the specific word 'YES'. If one of the reference patterns in the similar sound group has a high similarity with the LPC cepstrum coefficients, the pattern matching section 21 outputs the second specific word 'NO' as the result of recognition.

Figures 3A, 3B, 4:
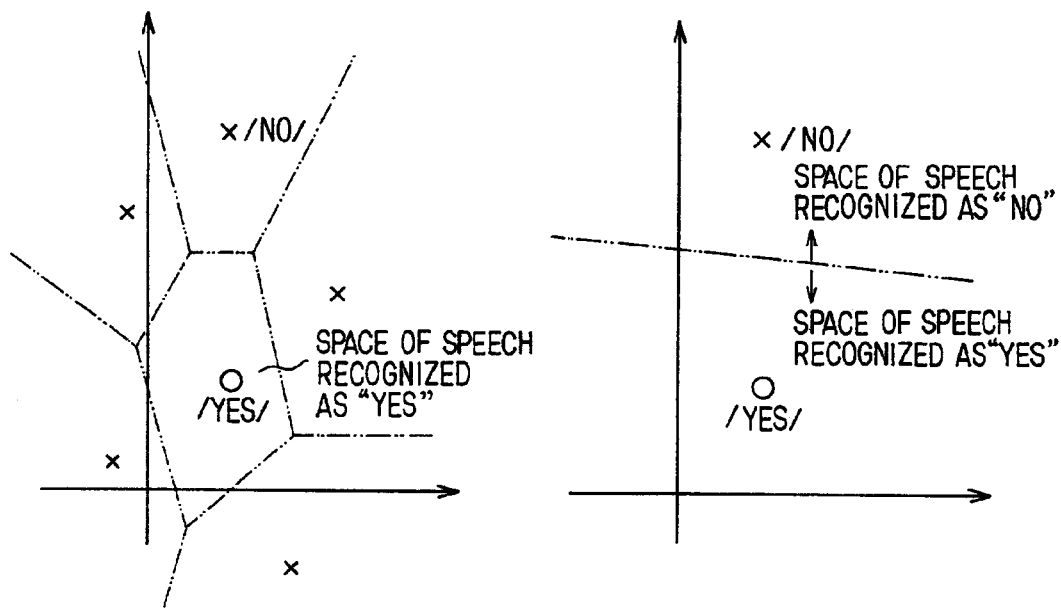
FIGS. 3A and 3B are schematic diagrams showing feature spaces of input speech signals which are recognized by the speech recognition apparatus according to the first embodiment and by a conventional speech recognition apparatus, respectively.
FIG. 4 is a table showing the result of experimentation for verifying the effects of the speech recognition apparatus according to the first embodiment.

In this way, the present speech recognition apparatus 18 recognizes the speech signal received in the situation of the above example as the word 'YES' only when the time-series of the LPC cepstrum coefficients is very close to the reference pattern of the word 'YES'. If the input speech signal is similar to but different from the specific word 'YES' or similar to but different from the second specific word 'NO', the word 'NO' would be outputted because the speech signal would have a high similarity with one of the reference patterns in the similar sound group. That is, the feature space of an input speech signal that is recognized as the word 'YES' is narrow and the feature space of an input speech signal that is recognized as the word 'NO' is broad as shown in FIG. 3A. In FIG. 3A, the horizontal axis represents, for example, the value of zeroth-degree term of the LPC cepstrum coefficients and the vertical axis represents the value of first-degree term of the LPC cepstrum coefficients. Further mark ○ represents the reference pattern corresponding to the word 'YES', and marks x represent the reference pattern corresponding to the word 'NO' and the reference patterns in the similar sound group. Thus the word 'NO' would be outputted as the result of recognition, if the candidate words include the word 'YES' but the level of confidence that the speech signal actually represent the word 'YES'.

In contrast to this, in the case of a conventional speech recognition apparatus, the characteristic space of an input speech signal that is recognized as the word 'YES' is relatively broad as shown in FIG. 3B. In FIG. 3B, the horizontal axis represents, for example, the value of zeroth-degree term of the LPC cepstrum coefficients and the vertical axis represents the value of first-degree term of the LPC cepstrum coefficients. Further mark ○ represents the reference pattern corresponding to the word 'YES', and marks x represent the reference pattern corresponding to the word 'NO'. Therefore, the speech signal that is similar to but different from the word 'YES' would be misrecognized as the word 'YES'.

The above effect of the present speech recognition apparatus 18 was verified through experimentation in the configuration shown in FIG. 2. The result of the experimentation is shown in FIG. 4. When input speech signals were not rerecognized by using the similar sound group, the probability that the speech signals which were different from the word 'YES' or the word 'NO' were misrecognized as the word 'YES' was relatively high (prior art: 61.9%). In contrast to this, such a probability was much lower (embodiment: 8.7%) when input speech signals were rerecognized by using the similar sound group. Further, the recognition rate of the word 'NO' was slightly higher (embodiment: 98.2%). The recognition rate of the word 'YES' was the same in both cases.

Accordingly, the car navigation equipment 1 is prevented from performing an operation that cannot be easily undone against the user's will, if an input speech signal received from the user in the situation of the above example is recognized by the present speech recognition apparatus.

In the present embodiment, Japanese corresponding words 'hai and 'iie' may be selected as the specific word and the second specific word instead of 'YES' and 'NO'. Further, German corresponding words 'ja' and 'nein', French corresponding words "oui' and 'non', Dutch corresponding words 'ja' and 'nee', Spanish corresponding words 'si' and 'no', Italian corresponding words 'si' and 'no', or Portuguese corresponding words 'sim' and 'não' may be selected as the specific word and the second specific word.

(Second Embodiment)

Figure 5:
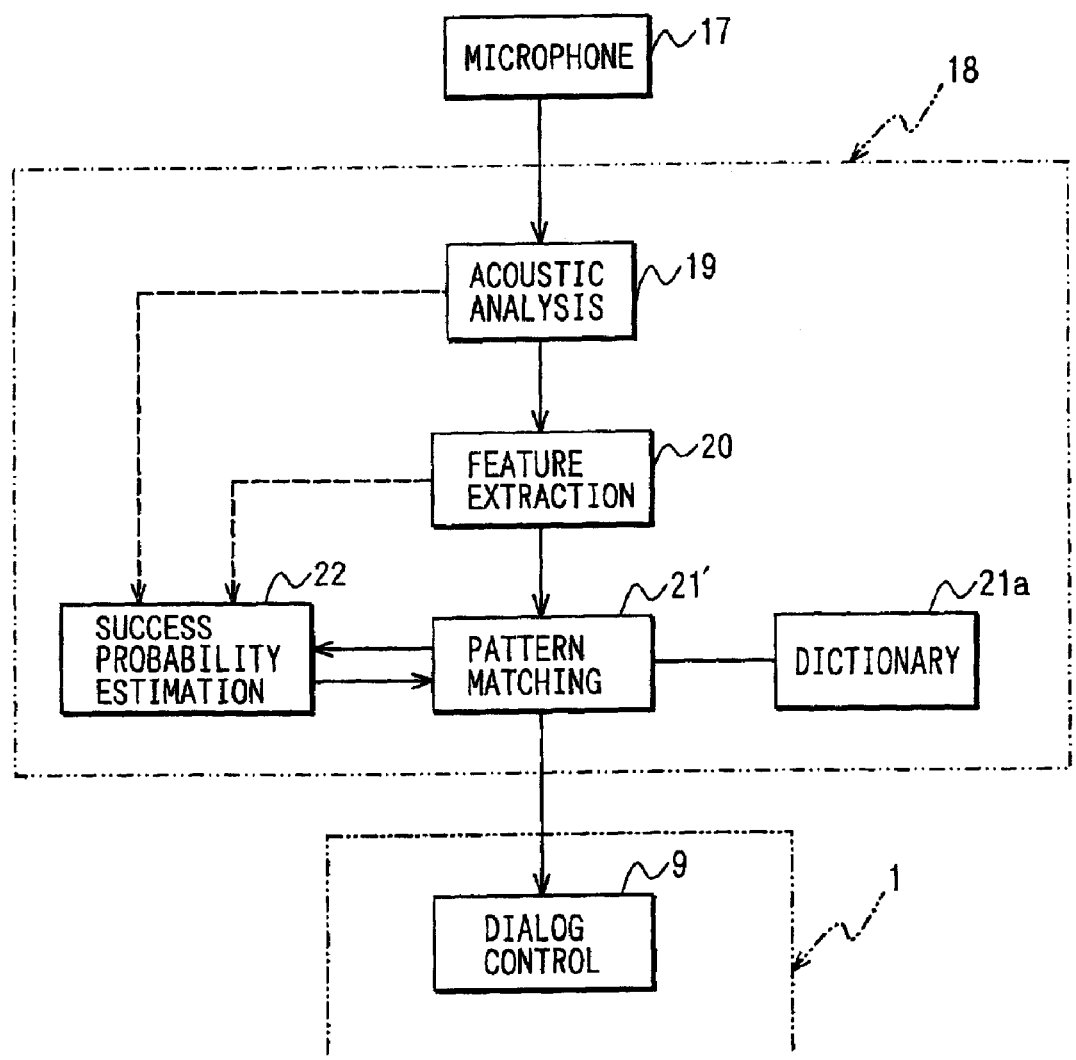
FIG. 5 is a block diagram of a speech recognition apparatus according to a second embodiment of the present invention.

Referring to FIG. 5, a speech recognition apparatus 18 includes an acoustic analysis section 19, a feature extraction section 20, and a pattern matching section 21' similarly to the first embodiment. The speech recognition apparatus 18 receives an input speech signal from a microphone 17 and recognizes it. The result of the recognition is outputted to a dialog control section 9 of a car navigation equipment 1. When the speech signal is recognized, the acoustic analysis section 19 and the feature extraction section 20 operate similarly to the first embodiment. However, the pattern matching section 21' performs pattern matching by using only ordinary dictionary data, and does not perform pattern matching by using the similar sound group. The ordinary dictionary data is stored in the dictionary section of the speech recognition apparatus 18 and includes reference patterns corresponding to words which should be identified. The pattern matching section 21' generates candidate words as the result of the pattern matching between the time-series data of LPC cepstrum coefficients received from the feature extraction section 20 and each of the reference patterns.

As shown in FIG. 5, the speech recognition apparatus 18 further includes a success probability estimation section 22 disclosed in Japanese Patent Application No. H11-359076 for estimating the level of confidence that the input speech signal actually represents a candidate word. When the candidate words include a specific word which is a critical word for the car navigation equipment 1, the pattern matching section 21 provides characteristic values concerning the recognition of the specific word for the success probability estimation section 22. The characteristic values provided by the pattern matching section 21' represent the likelihood ratio of the specific word and a connected-syllable model or the variance of duration of syllables in the specific word. The success probability estimation section 22 receives the characteristic values concerning the recognition of a candidate word, which is the specific word in this case, and estimates as the absolute level of confidence the probability that the input speech signal actually represents the candidate word based on the received characteristic values.

The characteristic values may be provided by the acoustic analysis section 19 instead of the pattern matching section 21' as shown by the broken line in FIG. 5. In this case, values which represent the degree of success in the acoustic analysis (i.e., the noise level or LPC residuals) are provided as the characteristic values. Alternatively the characteristic values may be provided by the feature extraction section 20 instead of the pattern matching section 21' as shown by the broken line in FIG. 5. In this case, values which represent LPC cepstrum coefficients are provided as the characteristic values.

The absolute level of confidence estimated by the success probability estimation section is provided for the pattern matching section 21' in the form of the probability that the input speech signal actually represents the specific word. The level of confidence can be grasped intuitively and quantitatively, if it is provided in the form of the success probability in this way. The pattern matching section 21' outputs a candidate word other than the specific word as the result of recognition, if the received absolute level of confidence is equal to or lower than the predetermined reference level. The reference level is experimentally determined beforehand.

As described above, the words corresponding to the reference patterns which have the high similarities with the LPC cepstrum coefficients are selected as the candidate words. Therefore the possibility that the input speech signal actually represents the candidate word is relatively high, but not always absolutely high. Accordingly, in the present speech recognition apparatus, the pattern matching section 21' determines based on the absolute level of confidence provided by the success probability estimation section 22 whether it outputs as the result of recognition the specific word which is one of the candidate word.

In this way, the specific word is outputted as the result of recognition only when the level of confidence that the input speech signal actually represents the specific word is absolutely high. That is, the possibility that the input speech signal which does not actually represent the specific word is misrecognized as the specific word is very low. The specific word is a critical word for the car navigation equipment 1 as described above. Accordingly, the car navigation equipment 1 is prevented from performing an operation which cannot be easily undone against the user's will.

(Modifications)

In the first embodiment, a program for implementing the function of the pattern matching section 21 in a computer system and data such as the reference patterns and the similar sound group may be provided as a detachable record medium which stores the program and the data. Various record media such as CD-ROM, DVD-ROM, non-volatile memory (i.e., EEPROM), a floppy disk, a magnetic optical disk, a hard disk may be employed as the record medium for storing the program and the data.

In the second embodiment, a program for implementing the function of the pattern matching section 21' and the success probability estimation section 22 in a computer system and data such as the reference patterns may be also provided as a detachable record medium which stores the program and the data. Further a confidence level estimation section which provides the absolute level of confidence in the form other than the success probability may be employed instead of the success probability estimation section 22.

The speech recognition apparatus 18 according to the present invention may be used for an external device other than the car navigation equipment 1, for example, a personal mobile navigation device or other popular electrical appliances.

What is claimed is:

1. A speech recognition apparatus for receiving and recognizing a speech signal from a speaker comprising:

an acoustic analysis means for analyzing a speech signal acoustically;

a feature extraction means for extracting characteristic parameters from the speech signal based on a result of the analysis performed by the acoustic analysis means; and a pattern matching means for performing pattern matching between each of reference patterns in a vocabulary and the extracted characteristic parameters and selecting as candidate words at least one word corresponding to the reference pattern that has a high similarity with the characteristic parameters, the vocabulary being stored beforehand and including the reference patterns corresponding to words, wherein:

the pattern matching means outputs as a result of recognition at least one word other than a specific word if the candidate words include the specific word and a level of confidence that the speech signal actually represents the specific word is low;

the pattern matching means is connected to an external device, and the external device receives and uses the result of recognition from the pattern matching means for controlling an operation of the external device;

a similar sound group which includes reference patterns corresponding to sounds which are similar to but different from that of the specific word is stored beforehand;

the pattern matching means performs pattern matching between each of reference patterns in the similar sound group and the characteristic parameters if the candidate words include the specific word; and the pattern matching means outputs as the result of recognition at least one word other than the specific word if one of the reference patterns in the similar sound group has a high similarity with the characteristic parameters.

2. A speech recognition apparatus for receiving and recognizing a speech signal from a speaker comprising:

an acoustic analysis means for analyzing a speech signal acoustically;

a feature extraction means for extracting characteristic parameters from the speech signal based on a result of the analysis performed by the acoustic analysis means, and a pattern matching means for performing pattern matching between each of reference patterns in a vocabulary and the extracted characteristic parameters and selecting as candidate words at least one word corresponding to the reference pattern that has a high similarity with the characteristic parameters, the vocabulary being stored beforehand and including the reference patterns corresponding to words wherein:

the pattern matching means outputs as a result of recognition at least one word other than a specific word if the candidate words include the specific word and a level of confidence that the speech signal actually represents the specific word is low;

the pattern matching means is connected to an external device, and the external device receives and uses the result of recognition from the pattern matching means for controlling an operation of the external device;

a similar sound group, which includes reference patterns corresponding to sounds that are similar to but different from that of the specific word, is stored beforehand;

the pattern matching means performs pattern matching between each of reference patterns in the similar sound ground and the characteristic parameters if the candidate words include the specific word;

the pattern matching means outputs as the result of recognition at least one word other than the specific word if one of the reference patterns in the similar sound group has a high similarity with the characteristic parameters;

the similar sound group further includes reference patterns corresponding to sounds which are similar to but different from that of a second specific word that means the opposite to the specific word; and the pattern matching means outputs as the result of recognition the second specific word if one of the reference pattern in the similar sound group has a high similarity with the characteristic parameters.

3. A speech recognition apparatus for receiving and recognizing a speech signal from a speaker comprising:

an acoustic analysis means for analyzing a speech signal acoustically;

a feature extraction means for extracting characteristic parameters from the speech signal based on a result of the analysis performed by the acoustic analysis means; and a pattern matching means for performing pattern matching between each of reference patterns in a vocabulary and the extracted characteristic parameters and selecting as candidate words at least one word corresponding to the reference pattern that has a high similarity with the characteristic parameters, the vocabulary being stored beforehand and including the reference patterns corresponding to words, wherein:

the pattern matching means outputs as a result of recognition at least one word other than a specific word if he candidate words include the specific word and a level of confidence that the speech signal actually represents the specific word is low;

the pattern matching means is connected to an external device, and the external device receives and uses the result of recognition from the pattern matching means for controlling an operation of the external device; and the pattern matching means outputs as a result of recognition at least one word other than the specific word if the candidate words include the specific word and an absolute level of confidence that the speech signal actually represents the specific word is low only in case that the speech signal is received in a situation where the speaker is prompted to reply to a query for confirming whether the speaker allows the external device to perform an operation which is not easily done.

4. A speech recognition apparatus for receiving and recognizing a speech signal from a speaker comprising:

a speech recognition means for recognizing the speech signal by using a vocabulary and outputting as a result of recognition at least one word in the vocabulary, the vocabulary being stored beforehand and including words;

a control means for receiving the result of recognition from the speech recognition means and outputting a control signal to an external device based on the result of recognition, wherein the control means directs an output device to output a query to the speaker for confirming whether the speaker allows the external device to perform an operation if the control means receives as the result of recognition a word which directs the external device to perform the operation, wherein the vocabulary includes a first word which allows the external device to perform an operation and a second word which inhibits the external device from performing an operation, and further includes similar words which are different from the first word but have acoustic characteristics similar to that of the first word, and wherein the speech recognition means outputs the first word or the second word as a result of recognition of a reply to the query, and outputs the second word if the reply has a high similarity with one of the similar words.

5. A speech recognition apparatus as in claim 4, wherein the first word is an affirmative word and the second word is a negative word.

6. A speech recognition apparatus as in claim 5, wherein the external device is a navigation device.

7. A method for recognizing a speech signal comprising the steps of:

receiving a speech signal from a speaker;

analyzing the received speech signal acoustically;

extracting characteristic parameters from the speech signal based on a result of the analysis;

calculating similarities between each of reference patterns in a vocabulary and the extracted characteristic parameters, the vocabulary being stored beforehand and including the reference patterns corresponding to words;

selecting as candidate words at least one word corresponding to the reference pattern which has a high similarity with the characteristic parameters;

calculating similarities between each of reference patterns in a similar sound group and the characteristic parameters if the candidate words include a specific word, the similar sound group being stored beforehand and including the reference patterns corresponding to sounds that is similar to but different from that of the specific word;

outputting as a result of recognition at least one word other than the specific word if the candidate words include the specific word and one of the reference patterns in the similar sound group has a high similarity with the characteristic parameters.

8. A method for recognizing a speech signal as in claim 7, wherein the outputted result of recognition is received and used by an external device for controlling an operation of the device, wherein the external device performs an operation which is not easily undone if it receives the specific word.

9. A speech recognition apparatus for receiving and recognizing speech signal from a speaker comprising:

an acoustic analysis means for analyzing the speech signal acoustically;

a feature extraction means for extracting characteristic parameters from the speech signal based on a result of the analysis performed by the acoustic analysis means; and a pattern matching means for:
performing pattern matching between each of reference patterns in a previously memorized recognition object vocabulary and the extracted characteristic parameters; and outputting as a recognition result a word that has a high matching (similarity) level, wherein:
the reference patterns in the recognition object vocabulary include reference patterns corresponding to a specific word and a group of reference patterns corresponding to an acoustic group similar to the specific word as a recognition object candidate group; and when the pattern matching means performs the pattern matching, in a case that a reference pattern that has a high matching similarity level with the extracted characteristic parameters is included in the recognition object candidate group, the pattern matching means outputs a word different than the specific word.

10. The speech recognition apparatus of claim 9, wherein:
the recognition result by the pattern matching means is disposed in an external device for controlling an operation of the external device, and the specific word is a word at has a possibility of adversely affecting the operation of the external device.

11. The speech recognition apparatus of claim 10, wherein the pattern matching means outputs the word different than the specific word when the speaker is prompted to execute a voice input to reply to a query for confirming whether the speaker allows the external device to perform a given operation.

12. The speech recognition apparatus of claim 10, wherein the external device whose operation is controlled by the recognition result by the pattern matching means is a navigation device.

13. A speech recognition method for receiving and recognizing speech signal from a speaker comprising:
analyzing the speech signal acoustically;
extracting characteristic parameters from the speech signal based on a result of the acoustic analysis; and
performing pattern matching between each of reference patterns in a previously memorized recognition object vocabulary and the extracted characteristic parameters; and
outputting as a recognition result a word that has a high matching (similarity) level, wherein:
the reference pattern in the recognition object vocabulary include reference patterns corresponding to a specific word and a group of reference patterns corresponding to an acoustic group similar the specific word as a recognition object candidate group; and when the pattern matching is performed, in a case that a reference pattern that has a high matching similarity level with the extracted characteristic parameters is included in the recognition object candidate group, the pattern matching includes outputting a word different than the specific word.

14. The speech recognition method of claim 13, wherein:
the method includes using the recognition result in an external device for controlling an operation of the external device, and the specific word is a word that has a possibility of adversely affecting the operation of the external device.

15. The speech recognition method of claim 14, wherein the pattern matching includes outputting the word different than the specific word when the speaker is prompted to execute a voice input to reply to a query for confirming whether the speaker allows the external device to perform a given operation.

16. The speech recognition apparatus of claim 14, wherein the external device whose operation is controlled by the recognition result of the pattern matching is a navigation device.

17. A speech recognition method for receiving and recognizing a speech signal from a speaker comprising:
analyzing a speech signal acoustically;
extracting characteristic parameters from the speech signal based on a result of the acoustic analysis; and
performing pattern matching between each of reference patterns in a vocabulary and the extracted characteristic parameters and selecting as candidate words at least one word corresponding to the reference pattern that has a high similarity with the characteristic parameters, the vocabulary being stored beforehand and including the reference patterns corresponding to words, wherein:
the pattern matching outputs, as a result of recognition, at least one word other than a specific word if the candidate words include the specific word and a level of confidence that the speech signal actually represents the specific word is low;
an external device receives and uses the result of recognition from the pattern matching for controlling an operation of the external device;
a similar sound group, which includes reference patterns corresponding to sounds that are similar to but different from that of the specific word, is stored beforehand;
the pattern matching includes pattern matching between each of reference patterns in the similar sound group and the characteristic parameters if the candidate words include the specific word; and
the pattern matching outputs, as the result of recognition, at least one word other than the specific word if one of the reference patterns in the similar sound group has a high similarity with the characteristic parameters.

18. A speech recognition method for receiving and recognizing a speech signal from a speaker comprising:
analyzing a speech signal acoustically;
extracting characteristic parameters from the speech signal based on a result of the acoustic analysis; and
performing pattern matching between each of reference patterns in a vocabulary and the extracted characteristic parameters and selecting as candidate words at least one word corresponding to the reference pattern that has a high similarity with the characteristic parameters, the vocabulary being stored beforehand and including the reference patterns corresponding to words, wherein:

the pattern matching outputs, as a result of recognition, at least one word other than a specific word if the candidate words include the specific word and a level of confidence that the speech signal actually represents the specific word is low;

an external device receives and uses the result of recognition from the pattern matching for controlling an operation of the external device;

a similar sound ground, which includes reference patterns corresponding to sounds which are similar to but different from that of the specific word, is stored beforehand, and the pattern matching include pattern matching between each of reference patterns in the similar sound group and the characteristic parameters if the candidate words include the specific word;

the pattern matching includes outputting, as the result of recognition, at least one word other than the specific word if one of the reference patterns in the similar sound group has a high similarity with the characteristic parameters;

the similar sound group further includes reference patterns corresponding to sounds that are similar to but different from that of a second specific word, which means the opposite to the specific word; and the pattern matching includes outputting, as the result of recognition, the second specific word if one of the reference pattern in the similar sound group has a high similarity with the characteristic parameters.

19. A speech recognition method for receiving and recognizing a speech signal from a speaker comprising:

analyzing a speech signal acoustically;

extracting characteristic parameters from the speech signal based on a result of the acoustic analysis; and performing pattern matching between each of reference patterns in a vocabulary and the extracted characteristic parameters and selecting as candidate words at least one word corresponding to the reference pattern that has a high similarity with the characteristic parameters, the vocabulary being stored beforehand and including the reference patterns corresponding to words, wherein:

the pattern matching includes outputting, as a result of recognition, at least one word other than a specific word if the candidate words include the specific word and a level of confidence that the speech signal actually represents the specific word is low;

an external device receives and uses the result of recognition from the pattern matching for controlling an operation of the external device; and the pattern matching includes outputting, as a result of recognition, at least one word other than the specific word if the candidate words include the specific word and an absolute level of confidence that the speech signal actually represents the specific word is low only in case that the speech signal is received in a situation where the speaker is prompted to reply to a query for confirming whether the speaker allows the external device to perform an operation that is not easily done.

20. A speech recognition method for receiving and recognizing a speech signal from a speaker comprising:

recognizing the speech signal by using a vocabulary and outputting, as a result of recognition, at least one word in the vocabulary, the vocabulary being stored beforehand and including words;

receiving the result of recognition from the speech recognition and outputting a control signal to an external device based on the result of the recognition; and outputting a query to the speaker for confirming whether the speaker allows the external device to perform operation if the received result of the recognition is a word that directs the external device to perform the operation, wherein:

the vocabulary includes a first word that allows the external device to perform an operation and a second word that inhibits the external device from performing an operation, and the vocabulary further includes similar words that are different from the first word but have acoustic characteristics similar to that of the first word; and the recognizing includes outputting the first word or the second word as a result of recognition of a reply to the query and includes outputting the second word if the reply has a high similarity with one of the similar words.

21. A speech recognition method as in claim 20, wherein the first word is an affirmative word and the second word is a negative word.

22. A speech recognition method as in claim 20, wherein the external device is a navigation device.

23. An apparatus for recognizing a speech signal comprising:

means for receiving a speech signal from a speaker;

means for analyzing the received speech signal acoustically;

means for extracting characteristic parameters from the speech signal based on a result of the analysis;

means for calculating similarities between each of reference patterns in a vocabulary and the extracted characteristic parameters, the vocabulary being stored beforehand and including the reference patterns corresponding to words;

means for selecting as candidate words at least one word corresponding to the reference pattern that has a high similarity with the characteristic parameters;

means for calculating similarities between each of reference patterns in a similar sound group and the characteristic parameters if the candidate words include a specific word, the similar sound group being stored beforehand and including the reference patterns corresponding to sounds that is similar to but different from that of the specific word; and means for outputting, as a result of recognition, at least one word other than the specific word if the candidate words include the specific word and one of the reference patterns in the similar sound group has a high similarity with the characteristic parameters.

24. An apparatus for recognizing a speech signal as in claim 23, wherein: the outputted result of recognition is received and used by an external device for controlling an operation of the device; and the external device performs an operation that is not easily undone if it receives the specific word.

* * * * *